US007925562B2

(12) United States Patent
Kuhnle et al.

(10) Patent No.: US 7,925,562 B2
(45) Date of Patent: Apr. 12, 2011

(54) NAV AND IIV PRICING FOR ACTIVELY MANAGED EXCHANGE TRADED FUNDS

(75) Inventors: Paul Edward Kuhnle, Doylestown, PA (US); George Tedesche Simon, Evanston, IL (US); John Stuart Thomas, Morristown, NJ (US); Mark Steven Criscitello, Colts Neck, NJ (US); Daniel Joseph McCabe, Upper Saddle River, NJ (US)

(73) Assignee: Diz Ventures, Morristown, NJ (US)

( * ) Notice: Subject to any disclaimer, the term of this patent is extended or adjusted under 35 U.S.C. 154(b) by 578 days.

(21) Appl. No.: 11/838,681

(22) Filed: Aug. 14, 2007

(65) Prior Publication Data

US 2009/0048985 A1 Feb. 19, 2009

(51) Int. Cl.
*G06Q 40/00* (2006.01)
(52) U.S. Cl. .................. 705/36 R; 705/35; 705/37
(58) Field of Classification Search ............... 705/1, 35, 705/36 R, 37
See application file for complete search history.

(56) References Cited

U.S. PATENT DOCUMENTS

| | | | | |
|---|---|---|---|---|
| 5,987,432 | A * | 11/1999 | Zusman et al. | 705/35 |
| 6,317,728 | B1 | 11/2001 | Kane | |
| 2001/0025266 | A1 * | 9/2001 | Gastineau et al. | 705/36 |
| 2002/0120555 | A1 | 8/2002 | Lerner | |
| 2003/0233302 | A1 | 12/2003 | Weber | |
| 2004/0254872 | A1 * | 12/2004 | Grzebeta et al. | 705/36 |
| 2005/0187857 | A1 * | 8/2005 | Tull, Jr. | 705/37 |
| 2006/0253376 | A1 * | 11/2006 | Seale et al. | 705/37 |

OTHER PUBLICATIONS

Premiums-discounts and exchange traded funds.(marketing) Engle, Robert; Sarkar, Debojyoti; Journal of Derivatives, v13, n4, p. 27(19) Summer, 2006 Document Type: Magazine/Journal; Academic Trade.*
Richard J Curcio, Joanna M Lipka, & John H Thornton Jr. (2004). Cubes and the individual investor. Financial Services Review, 13(2), 123-138. From ABI/INFORM Global. (Document ID: 701474951).*
Written Opinion mailed Nov. 5, 2008.

* cited by examiner

*Primary Examiner* — Alexander Kalinowski
*Assistant Examiner* — Abhishek Vyas
(74) *Attorney, Agent, or Firm* — DaVinci Intellectual Property; Robert Irvine; Atanu Das

(57) ABSTRACT

An ETF pricing mechanism for use in managed Exchange Traded Fund (ETF) or other collective investment vehicle (CIV) that retains the confidentiality of the vehicle's assets. The method of pricing may comprise: selecting a security price for each portfolio security, wherein each selected security price is associated with a time offset within a pricing interval, and wherein the time offsets are not identical for all of the selected security prices; generating a plurality of partial price components based on the selected security prices; determining a intra-day indicative value (IIV) of a CIV share in response to the plurality of partial price components; and, publishing the determined IIV.

22 Claims, 6 Drawing Sheets

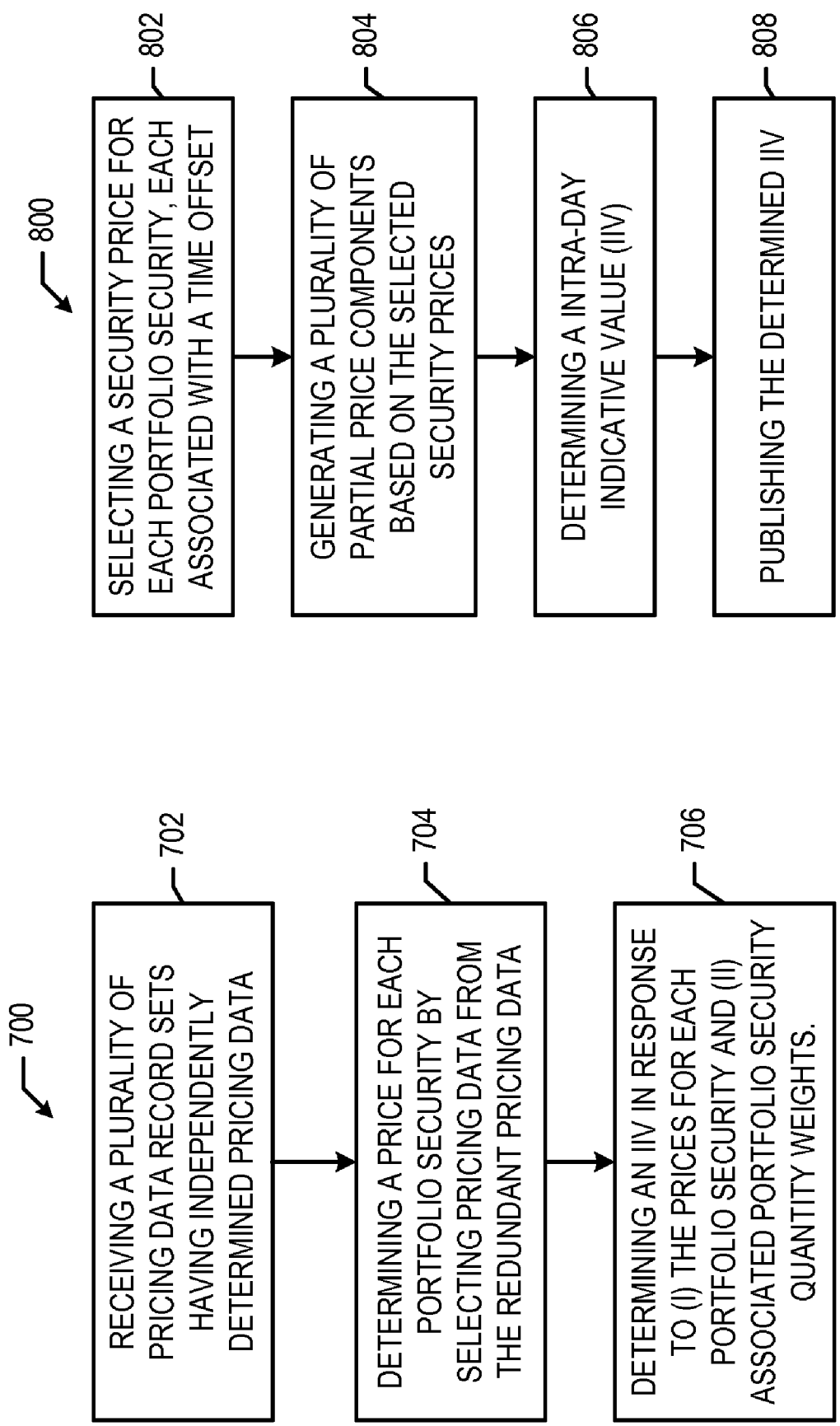

NAV AND IIV PRICING FOR ACTIVELY MANAGED EXCHANGE TRADED FUNDS

FIELD OF THE INVENTION

The present invention relates to collective investment vehicles. More particularly, the present invention relates to a mechanism for determining and publishing pricing information for an actively managed collective investment vehicle, such as an ETF.

BACKGROUND

Exchange Traded Funds, or ETFs, are a type of collective investment vehicle that owns a portfolio of securities and issues shares which are traded on a stock exchange or other organized market. Shares of an ETF are created by authorized participants (AP) by either delivering cash or a portfolio of securities or a combination of cash and securities to the ETF and receiving ETF shares in return. ETF shares may also be redeemed by APs by delivering ETF shares and receiving cash, portfolio securities or a combination thereof. Only an AP may create or redeem ETF shares. All other investors buy or sell ETF shares in an organized market.

All ETFs must be approved for issuance by the Securities and Exchange Commission (SEC). To date, all SEC-approved ETFs attempt to replicate the performance of a benchmark index. The SEC has not approved an ETF that is managed without reference to an index. An ETF that is managed without reference to an index is called an actively managed ETF.

In order to approve an ETF for issuance, the SEC has required that the market trading the ETF disseminate an indicative value of the ETF shares every 15 seconds during trading hours. Moreover, the SEC requires that any ETF that may be created by delivery of portfolio securities or redeemed in exchange for receipt of portfolio securities, publish the holdings of the fund every day. These two requirements have impeded the ability of ETF sponsors to create an actively managed ETF.

Some managed ETFs have been proposed based on securities other than equity securities. These ETFs comprise mainly fixed income obligations, and do not include common stocks, preferred stocks, warrants, or other equity securities. By restricting the portfolio securities to fixed income/debt securities, the importance of maintaining the confidentiality of the identity of the portfolio securities is decreased. That is, because these types of securities are quite fungible, and alternative equivalent securities are readily identifiable, there is little or no risk that the pricing of the portfolio securities will be affected by disclosure of their identity. In contrast, managed ETFs that focus primarily on equity securities remain impractical due to the risk that public disclosure of the specific equity securities in the fund portfolio may provide an indication of the ETF manager's investment strategy, thereby allowing the public to take on anticipatory positions in those specific securities.

In addition, a mechanism has been proposed to determine and publish pricing information of an actively managed ETF, and is described in U.S. Pat. No. 6,941,280 to Gastineau, the contents of which are hereby incorporated herein by reference. Nevertheless, these prior efforts remain deficient, and do not provide sufficient mechanisms to enable the existence of a managed equity-based ETF.

BRIEF SUMMARY OF THE INVENTION

Pricing mechanisms for a Collective Investment Vehicle (CIV) are described. The CIV may be an Exchange Traded Fund (ETF), Exchange Traded Note (ETN), Exchange Traded Trust (ETT), and the like. In one preferred embodiment, the method of pricing a CIV having a plurality of portfolio securities, comprises: selecting a security price for each portfolio security, wherein each selected security price is associated with a time offset within a pricing interval, and wherein the time offsets are not identical for all of the selected security prices; generating a plurality of partial price components based on the selected security prices; determining a intra-day indicative value (IIV) of a CIV share in response to the plurality of partial price components; and, publishing the determined IIV.

In some embodiments, an entity such as a pricing agent selects a security price for one group of securities at a first time offset within a pricing interval, and selects a security price for another group of securities at a second time offset within the pricing interval. There may be more than two groups, and in one embodiment, each individual security price may be determined at a different time offset. As a further alternative, the time offsets may vary from one pricing interval to the next. In this regard, in a first pricing interval, a first set of time offsets may be used to select the security prices, and in a subsequent pricing interval a different set of time offsets may be used to select the prices of the securities. Still further, a single time offset may be used to select all of the security prices for a first pricing interval, and in a subsequent pricing interval a different offset may be used to select the prices of all of the securities.

In some embodiments, the security prices are selected from separate price data feeds. Preferably, each of the separate price data feeds provides redundant security prices of at least a portion of the portfolio securities, and selecting a security price for each portfolio security includes randomly choosing a security price from the redundant security prices. Each of the separate price data feeds preferably provides security prices of the portfolio securities at respective random offsets within the pricing interval, or alternatively, each of the separate price data feeds provide security prices of the portfolio securities at respective predetermined offsets within the pricing interval.

In one embodiment, the plurality of partial price components is generated by adjusting each of the selected security prices by a corresponding quantity weight. Alternatively, the plurality of partial price components is generated by filtering the selected security prices and then adjusting each of the filtered selected security prices by a corresponding quantity weight. The filtering may be a simple moving average filter, exponential moving average, volume weighted average, etc.

An alternative method of pricing a CIV preferably includes: receiving a plurality of partial CIV prices, each of the plurality of partial CIV prices determined by: (i) obtaining prices of portfolio securities, the prices having an associated time offset within a pricing interval, wherein the time offset for each of the determined partial CIV prices is unique; (ii) adjusting the prices by a corresponding quantity weight; and, (iii) aggregating the adjusted prices into a partial CIV price; and then summing the plurality of partial CIV prices into an IIV of a CIV price; and, publishing the IIV. The partial CIV price determination may further comprise filtering the prices using a moving average prior to adjusting the prices by a corresponding quantity weight. Furthermore, each of the plurality of partial CIV prices is preferably based on a corresponding partial portfolio composition file. That is, the portfolio composition is divided into the corresponding partial portfolio composition files. In some embodiments, the quantities of at least one of the portfolio securities are divided among more than one corresponding partial portfolio composition files.

In yet another alternative, the method of pricing a CIV comprises: receiving a plurality of pricing data record sets, each pricing data record set containing pricing data for at least a portion of the portfolio securities, the plurality of pricing data record sets having independently determined pricing data, and wherein the plurality of pricing data record sets contains redundant pricing data for at least some of the portfolio securities; determining a price for each portfolio security by selecting pricing data from the redundant pricing data for at least some of the portfolio securities; and determining an intraday indicative value (IIV) of a CIV share in response to (i) the prices for each portfolio security and (ii) associated portfolio security quantity weights.

The step of determining a price for at least some of the portfolio securities is preferably performed by randomly selecting pricing data from the redundant pricing data. Furthermore, the independently determined pricing data of the plurality of pricing data record sets may be obtained by generating the pricing data record sets at different time offsets within a pricing window. The time offsets may be predetermined, or may be randomly determined.

In a further embodiment, the method of pricing a CIV having a plurality of portfolio securities comprises the steps of generating a plurality of intra-day indicative values (IIV), each of the individual ones of IIVs being determined within a separate pricing interval; selecting prices of the portfolio securities to compute each of the plurality of IIVs, wherein each selected price has an associated time offset within the pricing intervals, and wherein the time offsets are varied such that either (i) at least two associated time offsets within a given pricing interval are different from each other, or (ii) at least one associated time offset changes from one time interval to another, or both (i) and (ii).

In a further embodiment, pricing the NAV of the CIV is performed by using the techniques described herein, with one distinction being that the closing prices are used. That is, one or more of the following techniques may be used alone or in combination to provide the end-of-day NAV: dividing the portfolio composition files into a plurality of partial portfolio composition files each containing at least a portion of the securities in the portfolio, and providing the partial portfolio composition files respectively to a plurality of pricing agents; identifying the portfolio securities in a portfolio composition file or partial portfolio composition file using pseudo security identifiers and providing the files to a pricing agent, wherein the pricing agent responsively provides pricing data for the securities, but under the pseudo name identifiers; applying a weighting factor to the security prices prior to forwarding the pseudo security identifiers and associated prices to a second pricing agent; applying a weighting factor to the portfolio securities prices at a second pricing agent or at a pricing consolidator; applying a second weighting factor at a second pricing agent; a pricing consolidator calculating the total portfolio NAV based on either the individual weighted securities prices and optionally applying an additional weighting factor, or on a partial portfolio price from an aggregate of security prices for a portion of the portfolio as provided by a pricing agent.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 7 and 8 are flow charts depicting some preferred embodiments of CIV pricing methods.

DETAILED DESCRIPTION

Figure 1:
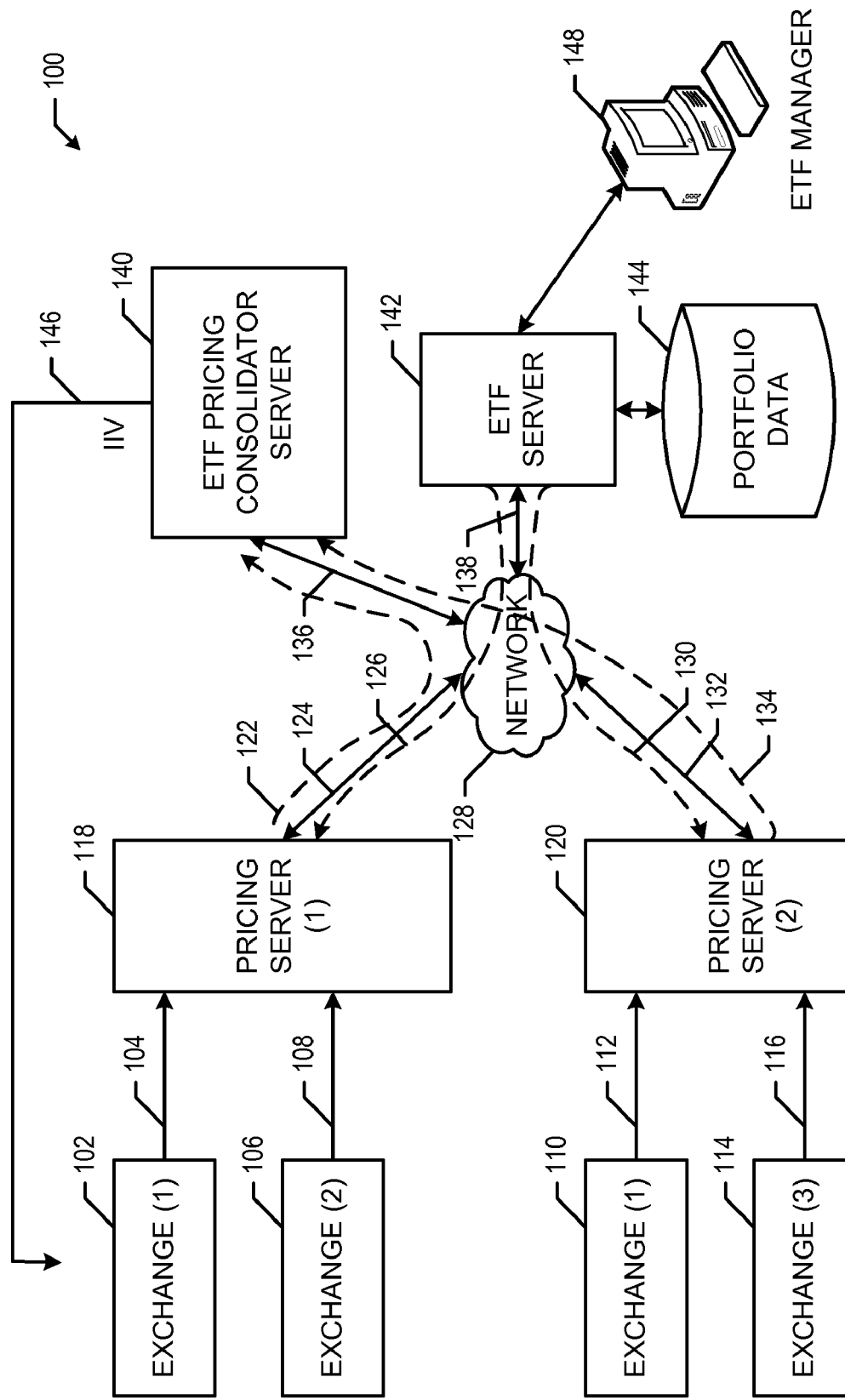
FIG. 1 is a block diagram depicting certain aspects of a preferred CIV pricing system.

With reference to FIG. 1, a preferred system 100 of generating intraday indicative values (IIV) and net asset values (NAV) of an exchange traded fund (ETF) will be described. While the methods and systems described herein may be used for any type of ETF, they are particularly beneficial in conjunction with actively managed ETFs.

System 100 preferably includes a plurality of exchanges 102, 106, 110, 114 providing pricing data feeds to pricing servers 118 and 120 via data feed connections 104, 108, 112, 116. Alternatively, a quote service or quote vendor may be used to gather pricing data from the various exchanges and to provide the aggregated quote and trade data to the pricing servers. The pricing servers 118 and 120 are preferably connected to the ETF server 142 and the ETF pricing consolidator 140 via suitable data networking infrastructure denoted as network 128 and associated data link interconnections 124, 132, 136, 138. Network 128 may be a public network such as the internet, or may be private communication means such as leased data lines.

Suitable networking protocols may be used, including the Transport Control Protocol/Internet Protocol (TCP/IP) suite of protocols, and also including the HyperText Transport Protocol (HTTP) and associated security protocols HTTPS, and other mechanisms such as Virtual Private Networking (VPN), Secure Sockets Layer (SSL), Transport Layer Security (TLS), tunneling protocols such as Generic Routing and Encapsulation (GRE), Layer 2 Tunneling Protocol (L2TP), and the like. Another protocol that may be used to facilitate the transactions and associated messaging described herein is the Financial Information eXchange (FIX) Protocol, which is a messaging standard developed specifically for the real-time electronic exchange of securities transactions. FIX is a public-domain specification owned and maintained by FIX Protocol, Ltd. In addition, some of the transactions may be communicated in a manual fashion, such as via telephone or textual messaging (email, and the like), whereupon the relevant transaction information may be entered into the appropriate computer systems.

One aspect of an ETF is the calculation and reporting of the intraday indicative value, or IIV. In order to maintain the confidentiality of the holdings the managed ETF, the ETF server 142 may provide partial position information 126, 130 to a plurality of pricing agents, such as pricing server (1) 118 and pricing server (2) 120. In one embodiment, the ETF server system includes a manager access interface on workstation 148 that allows the manager to identify and/or configure partial portfolio composition files that are to be sent to the various pricing agents. Preferably, a plurality of partial position data records containing partial portfolio composition information is electronically transmitted to a plurality of pricing agents. The partial portfolio composition information includes security identifiers and corresponding quantity information, and may include only a subset of the portfolio holdings (a subset of the individual security identifiers, or a subset of the respective quantity, or a combination thereof).

In some embodiments, a portion of the quantities of at least some of the portfolio securities are divided among more than one corresponding partial portfolio composition files. For example, the CIV may hold 1,000 shares of a particular security representing 1% of the entire portfolio value. Two separate portfolio composition files may be generated and provided to separate pricing agents, wherein one composition file indicates a relative weight of 0.007, while the other indicates a relative weight of 0.003. This type of quantity division may optionally be done for one or more, or even all of the securities. If all of the securities are divided, then it may be desirable to use more than two pricing agents so that no single entity would have a complete listing of the security identities. The partial portfolio composition information 126, 130 may also include some erroneous stock identifiers and/or the ETF may maintain a token number of a variety of securities in order to further mask the exact makeup of the ETF holdings.

The pricing agents then provide partial pricing data 122, 134 to the IIV consolidator 140. Preferably, the pricing data is taken from two or more different time offsets within a given pricing interval (such as a fifteen second interval). That is, the prices (or bid/ask pairs) used in the determination of the IIV values do not necessarily represent the most recent price of the various portfolio securities. Rather, the prices may be taken from a snapshot of the portfolio securities from some point within the prior fifteen second pricing interval. Each price may be selected at a predetermined offset time, or a random offset time. Alternatively, one or more snapshots may be taken of the portfolio security prices (or subsets thereof) resulting in sets of data records having overlapping or redundant price information, and a selection may then be made as to which actual price will be used to calculate the IIV. The selection is preferably random (or pseudo-random).

Thus, the partial pricing data may take various forms, including sets of data records containing prices for various securities within the ETF portfolio, or an aggregated price for a fractional portion of a share of the ETF. Alternatively, the pricing data may include bid/ask pairs for various securities with the ETF portfolio, or even an aggregated bid/ask pair for a fractional ETF share. The IIV consolidator 140 consolidates the partial pricing data into an IIV, and provides the ETF IIV 146 to exchanges 102, 106, 110, and 114, as well as to customers of those exchanges.

The ETF associated with ETF server 142 is preferably an actively managed fund wherein the ETF manager engages in transactions in the market in order to alter the contents or holdings of the ETF, as reflected in portfolio database 144. The ETF manager may also, or alternatively, alter the holdings of the ETF through a series of creation and redemption events as described in copending application entitled "Actively Managed Exchange Traded Fund Using AP Representatives for Creation and Redemption," Ser. No. 11/758,564, filed Jun. 5, 2007, the contents of which are hereby incorporated herein by reference.

Figure 2:
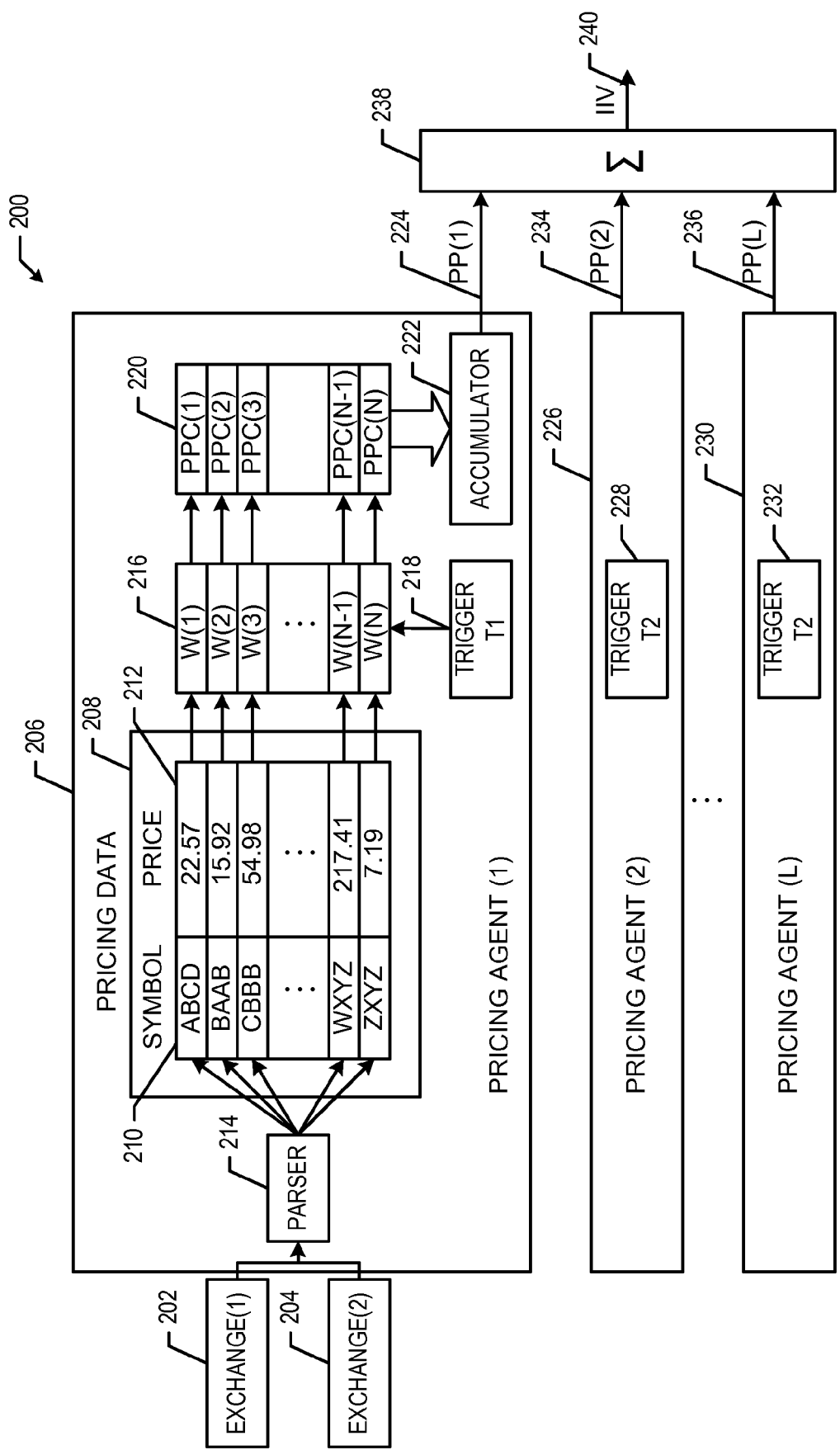
FIG. 2 is a block diagram depicting additional details relating to a preferred system for CIV pricing.

With reference to the embodiment 200 of FIG. 2, multiple pricing agent computer servers 206, 226, 230 may be used to generate the IIV. Pricing agent server 206 is shown with connections to two exchanges 202, 204. More exchanges may provide data to the pricing agents, and each pricing agent need not necessarily use the same exchange data feeds. The exchange data feeds are not depicted for pricing agent servers 226, 230. Alternatively, one or more quote vendors may act as intermediaries to collect data from the exchanges and provide the aggregated data feeds to the pricing servers 206, 226, 230. Each pricing agent preferably analyzes the data feeds for the relevant price data. This action is performed by the parser 214, which checks for the transaction message type (e.g., bid/ask, trade, etc.) and uses the relevant data to populate the pricing data table or array 208, which includes in this embodiment a column 210 for the portfolio security symbol, and a column 212 for the respective price of the most recent trades in those securities.

When a trigger event occurs as determined by trigger 218 (which may be a simple timer, or a random or pseudo-random timing signal generator, or other suitable software mechanism such as a function call, interrupt or the like), the then-current pricing information is multiplied by the relative quantity weightings W(1) through W(N) as shown in array 216. Note that the weights may proportional values of the portfolio securities relative to the entire portfolio, or they may be normalized to add to 1.00 for each pricing agent, and then corrected prior to combination by the aggregator 238.

The results of the multiplication are stored in array 220, which then contain partial price components PPC(1) through PPC(N). These partial prices are then accumulated into a partial pricing value PP(1) and provided to a consolidator 238, which operates on the partial pricing PP(2) 234 through PP(L) 236 to provide IIV 240. Note that each pricing agent has an independent trigger 228, 232, which may be predetermined, random, or pseudo-random, but the trigger still occurs within the fifteen second pricing window. This time-offset variability is one way in which the IIV value is somewhat randomized, yet still provides an accurate measure of the IIV. In an alternative embodiment, the different trigger events 218, 228, 232 may be utilized by a single pricing agent, where each trigger operates on a subset of the securities in the CIV portfolio. A single accumulator may then operate on the partial price components.

Thus, as described above, in one preferred embodiment, the method of pricing a collective investment vehicle (CIV) having a plurality of portfolio securities comprises: selecting a security price for each portfolio security, wherein each selected security price is associated with a time offset within a pricing interval, and wherein the time offsets are not identical for all of the selected security prices; generating a plurality of partial price components based on the selected security prices; determining an intra-day indicative value (IIV) of a CIV share in response to the plurality of partial price components; and, publishing the determined IIV.

Alternatively, the method of pricing a CIV preferably includes: receiving a plurality of partial CIV prices, each of the plurality of partial CIV prices determined by: (i) obtaining prices of portfolio securities, the prices having an associated time offset within a pricing interval, wherein the time offset for each of the determined partial CIV prices is unique; (ii) adjusting the prices by a corresponding quantity weight; and, (iii) aggregating the adjusted prices into a partial CIV price; and then summing the plurality of partial CIV prices into an IIV of a CIV price; and, publishing the IIV.

Figure 3:
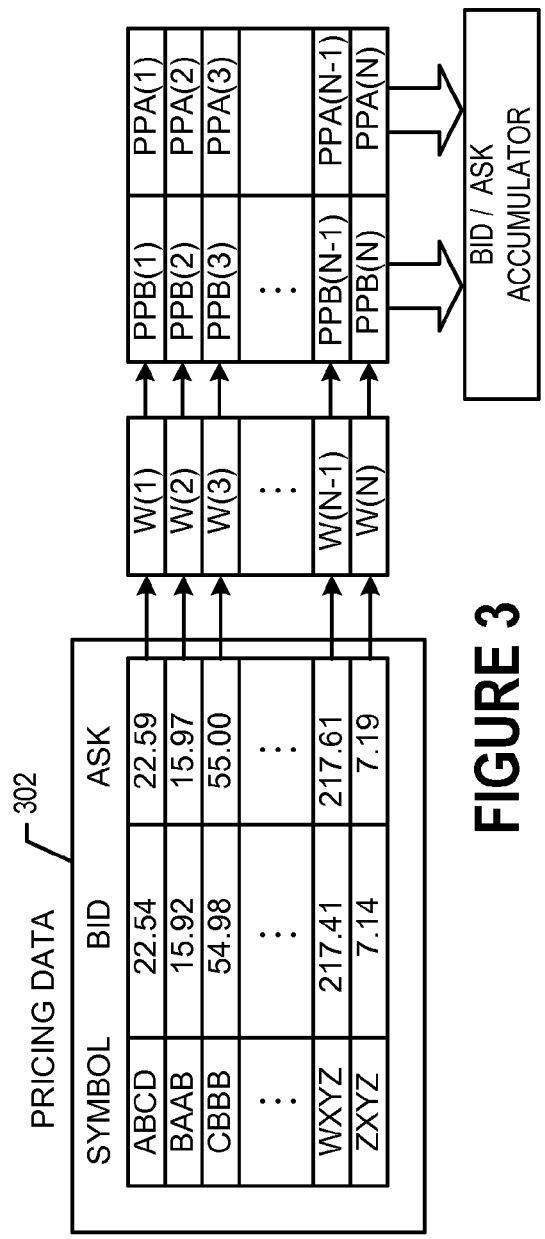
FIG. 3 is a block diagram depicting an alternative embodiment of a pricing system for providing two-sided quotes for an CIV.

With respect to FIG. 3, a portion of the system is shown where the pricing data 302 includes quotes, or bid and ask prices, for each portfolio security. The bid and ask prices may be operated on using portfolio quantity weights W(1) through W(N) (normalized or not) and the partial pricing bid (PPB) and partial pricing ask (PPA) values are accumulated.

Figure 4:
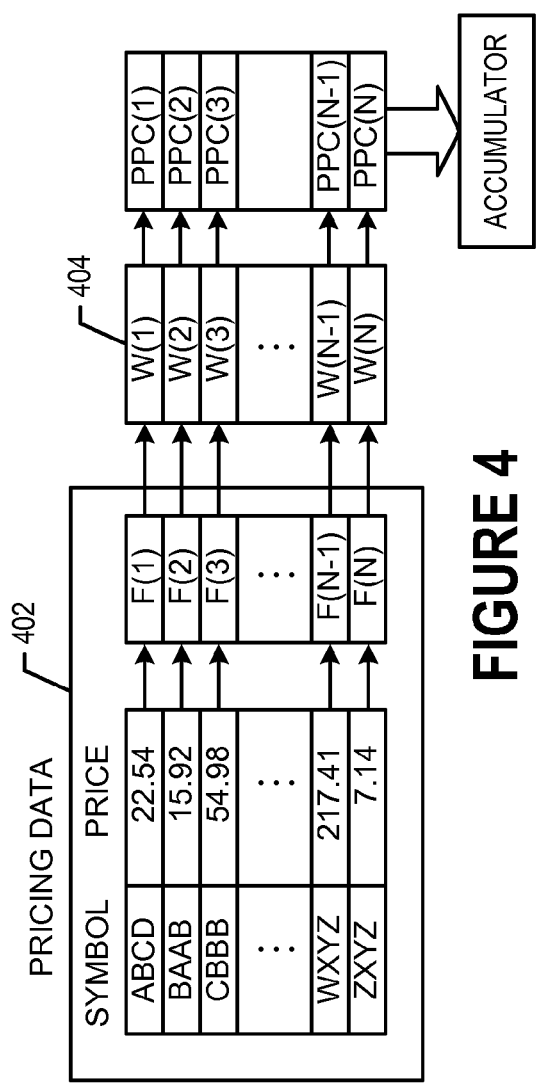
FIG. 4 is a block diagram depicting an alternative embodiment of a pricing system for an CIV using a filter to determine pricing information.

FIG. 4 depicts an embodiment where the pricing data 402 is filtered by filters F(1) through F(N) shown in column 404. The filters may be simple moving average or exponential moving average having a time window of approximately 15 seconds, or as long as five minutes. The filters may also perform volume weighted averaging or other well-known price filtering operations.

Figure 5:
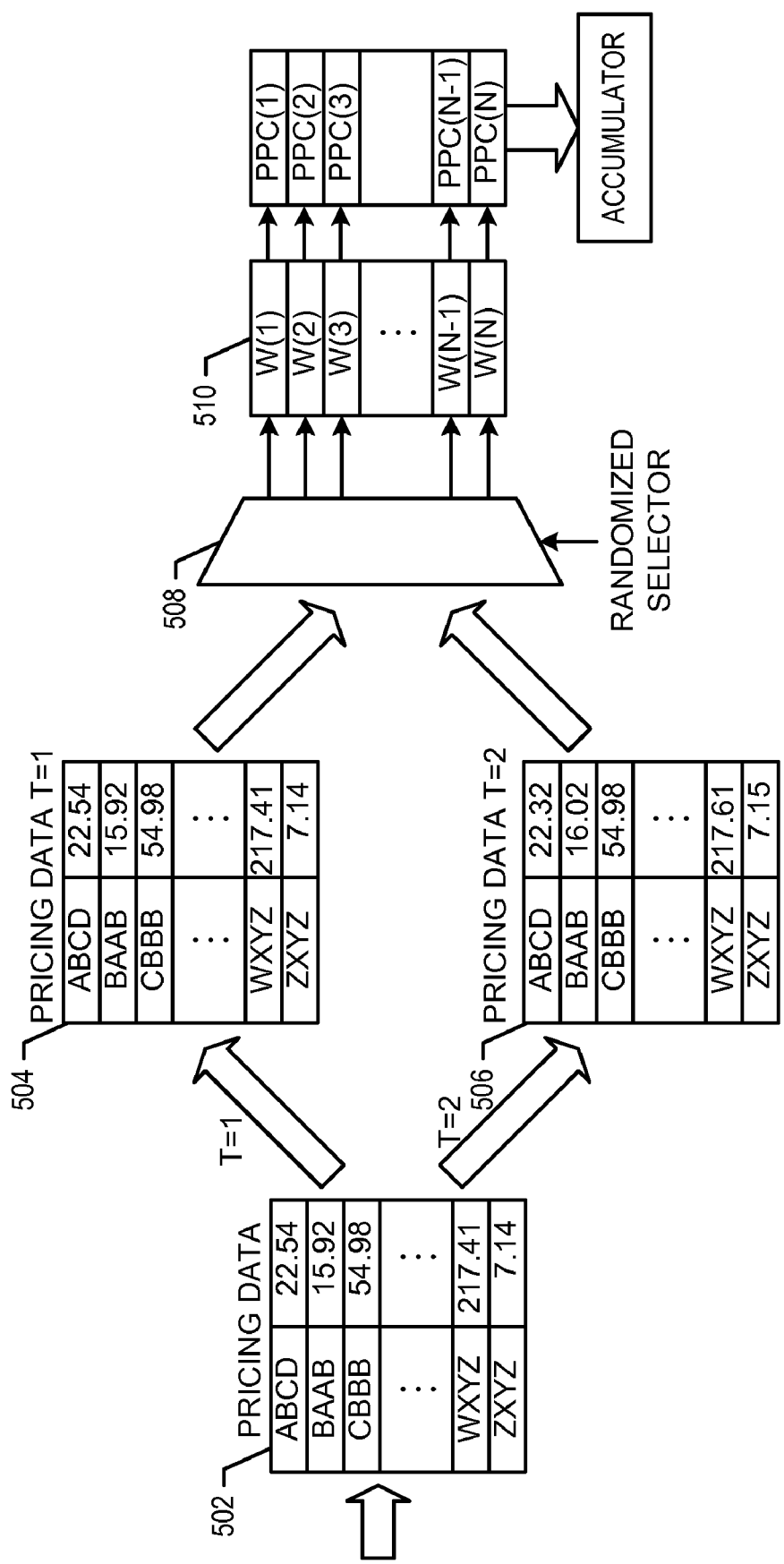
FIG. 5 is a block diagram of a further alternative embodiment of a pricing system for an CIV.

Turning to FIG. 5, an embodiment is described where a single pricing table 502, or array, is generated, but is then sampled at different times (T1 and T2, which may be predetermined, random, or pseudo-random) to obtain alternative pricing data record sets 504, 506. The pricing agent therefore selects security prices for one group of securities at a first time offset within a pricing interval, and selects security prices for another group of securities at a second time offset within the pricing interval. There may be more than two groups, and in one embodiment, each individual security price may be determined at a different time offset. As a further alternative, the time offsets may vary from one pricing interval to the next. In this regard, in a first pricing interval, a first set of time offsets may be used to select the security prices, and in a subsequent pricing interval a different set of time offsets may be used to select the prices of the securities. Still further, a single time offset may be used to select all of the security prices for a first pricing interval, and in a subsequent pricing interval a different offset may be used to select the prices of all of the securities. Thus, each of the separate sets preferably provides security prices of the portfolio securities at respective predetermined, pseudo-random or random offsets within the pricing interval. In this sense, these data sets are said to be independently generated. Alternatively, some embodiments may generate tables 504, 506 from separate price data feeds altogether, further reducing their correlation and increasing their independence. In this case, each of the separate price data feeds preferably provides security prices of the portfolio securities at different respective offsets within the pricing interval.

The above embodiment may therefore be described as follows: the IIV for each separate pricing interval may be determined by selecting prices of the portfolio securities, wherein each selected price has an associated time offset within the pricing intervals, and wherein the time offsets are varied by one or more techniques. The variation in the offsets may be within a single pricing interval such that at least two associated time offsets within a given pricing interval are different from each other, or (ii) at least one associated time offset changes from one time interval to another, or a combination of both (i) and (ii).

While the data sets 504 and 506 are shown to list the same securities, they need not be identical. Preferably, however, each of the separate data sets overlaps with the other to some extent such that there exist redundant security prices of at least a portion of the portfolio securities. The system and method may then select a security price for each portfolio security via suitable hardware or software (depicted as multiplexing operation 508). For each portfolio security, the selection between one value in data set 504 versus the value in data set 506 may be done randomly or pseudo-randomly.

The plurality of partial price components is then generated by adjusting each of the selected security prices by a corresponding quantity weight W(1) through W(N) in column 510. Alternatively, as described above, the plurality of partial price components is generated by filtering the selected security prices and then adjusting each of the filtered selected security prices by a corresponding quantity weight. Again, the filtering may be a simple moving average filter, exponential moving average, volume weighted average, etc.

The system 100 divides the task of obtaining security prices by using the independent actions of pricing agents 118 and 120. This may be described as a horizontal division of the pricing task since each pricing agent is performing similar functions in parallel. Additional (or alternative) protection of pricing data may be obtained by dividing the task of determining security prices in a vertical fashion between two price agent entities as follows: A first pricing agent entity obtains a table of actual security identifiers and corresponding pseudonym security identifiers, and a second pricing agent entity obtains a table of pseudonym security identifiers and corresponding weights. Thus, a given security is linked to its corresponding portfolio weighting only by way of a pseudonym security identifier. In this embodiment, the first pricing agent entity determines the security price (as described using the various techniques set forth herein) and reports the security prices to the second pricing agent entity using only the pseudonym security identifiers. The second pricing agent entity then applies the corresponding weighting to the prices of the pseudonym securities to obtain a CIV price (or partial CIV price). Thus, no single pricing agent has access to both the true security identifiers and their corresponding weights.

Figure 6:
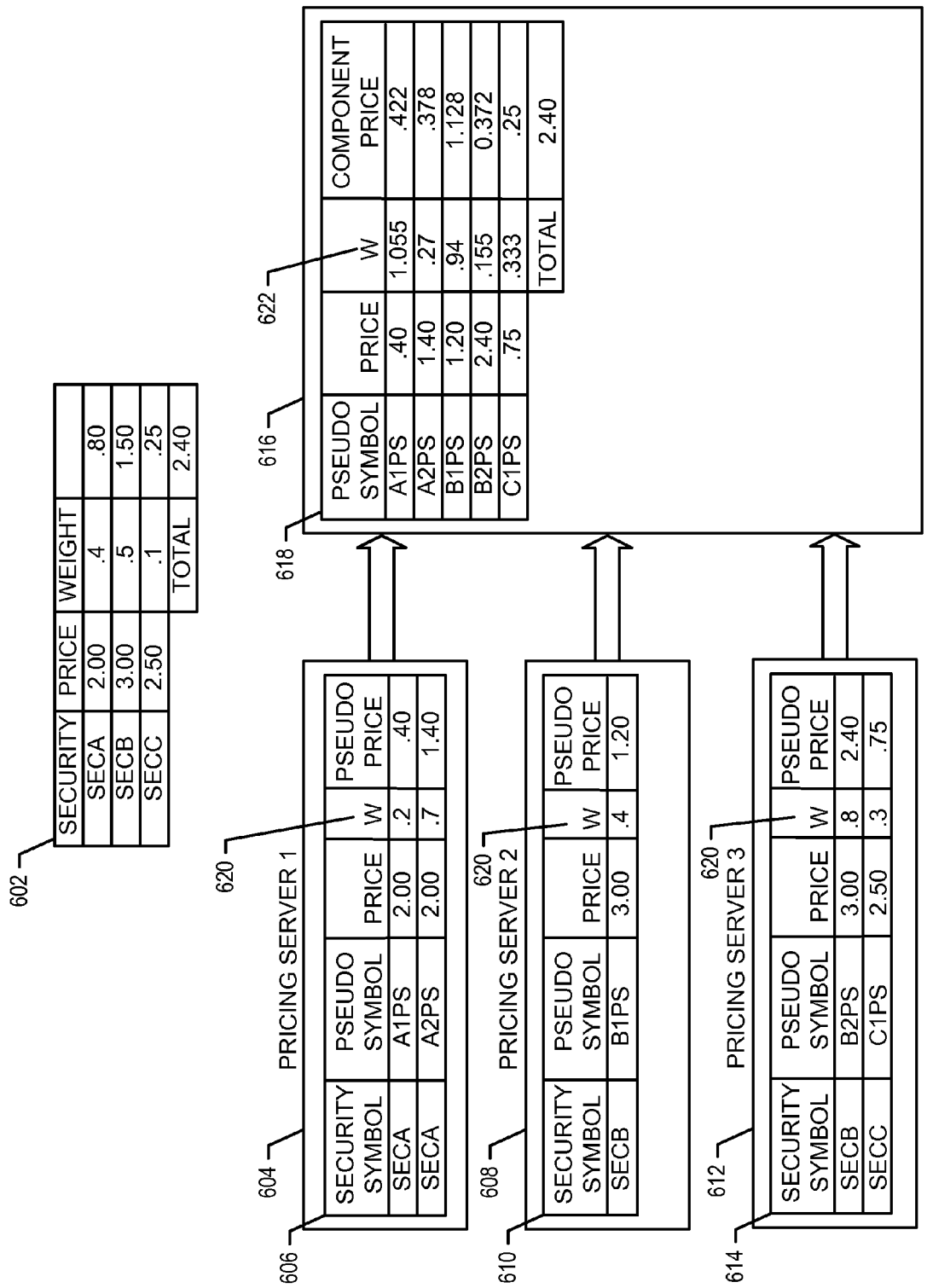
FIG. 6 is a further alternative system for pricing a CIV.

In a further alternative embodiment, with reference to FIG. 6, the system preferably includes a plurality of pricing servers such as pricing servers 604, 608, and 612 to provide pricing data for the example portfolio shown in table 602. Each of the pricing servers includes an electronic record or database 606, 610, and 614, respectively, which includes security identifiers, or symbols, a corresponding pseudo symbol, and their respective prices, as described above. In addition, however, the pricing servers apply a weight 620 to the security price prior to transmitting with its pseudo symbol it to the next pricing agent, or pricing consolidator 616. The application of weights 620 serves to further obscure and protect the identity of the actual security. Note also that a given security may be mapped to more than one pseudo symbol as shown by security SECA being mapped to pseudo symbols A1PS and A2PS. Furthermore, the dual mapping (or multiple mapping) may be done by one pricing server such as pricing server 1 604, or may be done by more than one pricing server such as the case with security SECB being mapped to pseudo symbol B1PS by pricing server 2 with a weight of 0.4 and to pseudo symbol B2PS by pricing server 3 with a weight of 0.8. One or more of the securities may be mapped by a single pricing server such as security SECC being mapped by pricing server 3 to pseudo symbol C1PS. Note that the combination of weights 620 and 622 are such that the appropriate cumulative effect is equal to the weight from table 602.

With reference to FIG. 7, a preferred method 700 of pricing a CIV comprises: at step 702, receiving a plurality of pricing data record sets, each pricing data record set containing pricing data for at least a portion of the portfolio securities, the plurality of pricing data record sets having independently determined pricing data, and wherein the plurality of pricing data record sets contains redundant pricing data for at least some of the portfolio securities; at step 704 determining a price for each portfolio security by selecting pricing data from the redundant pricing data for at least some of the portfolio securities; and at step 706 determining an intraday indicative value (IIV) of a CIV share in response to (i) the prices for each portfolio security and (ii) associated portfolio security quantity weights.

The step of determining a price for at least some of the portfolio securities is preferably performed by randomly selecting pricing data from the redundant pricing data. Furthermore, the independently determined pricing data of the plurality of pricing data record sets may be obtained by generating the pricing data record sets at different time offsets within a pricing window. The time offsets may be predetermined, or may be randomly determined.

With reference to FIG. 8, a preferred method 800 will be described. Method 800 includes the steps of: at step 802, selecting a security price for each portfolio security, wherein each selected security price is associated with a time offset within a pricing interval, and wherein the time offsets are not identical for all of the selected security prices; at step 804, generating a plurality of partial price components based on the selected security prices; at step 806 determining a intraday indicative value (IIV) of a CIV share in response to the plurality of partial price components; and, at step 808, publishing the determined IIV.

Note that there are numerous hardware implementations of the systems described herein that may be realized using memory devices, shift registers, multipliers, accumulators and the like. It is further understood that the functions described herein may also be performed using appropriately programmed computers with appropriate software languages and data structures. In particular, the systems described above may include computer readable storage media for use with computer systems to effectuate certain steps described herein. The computer-readable media may contain instructions to cause a microprocessor to execute the following steps: electronically receiving partial pricing data and automatically computing an intraday indicative value (IIV); and, electronically transmitting the IIV via a data communication feed. In addition, instructions may include those for transmitting a plurality of partial position data records containing partial position information to a plurality of pricing agents.

An exemplary embodiment of the invention has been described above. Those skilled in the art will appreciate that changes may be made to the embodiment described without departing from the true spirit and scope of the invention as defined by the claims.

We claim:

1. A method of pricing a collective investment vehicle (CIV) having a plurality of portfolio securities, comprising:
   at a pricing-agent computer system, receiving partial portfolio composition information for a subset of the portfolio securities;
   at the pricing-agent computer system, selecting a security price for each portfolio security from the subset, wherein each selected security price is associated with a time offset within a pricing interval, and wherein the time offsets used to select security prices are not identical for all of the portfolio securities
   at the pricing-agent computer system, generating a plurality of partial price components based on the selected security prices;
   at the pricing-agent computer system, using the partial price components as a basis for determining a partial price value for the subset of the portfolio securities;
   transmitting the determined partial price value to the pricing-agent computer system for aggregation with other partial price values associated with the CIV to determine and publish an intra-day indicative value (IIV) of a CIV share, wherein the other partial price values are provided by other pricing-agent computer systems.

2. The method of claim 1 wherein the security prices are selected from separate price data feeds.

3. The method of claim 2 wherein each of the separate price data feeds provides security prices for at least some of the same portfolio securities, and wherein, for portfolio securities having security prices provided by two or more of the separate price data feeds, selecting a security price for each portfolio security comprises randomly choosing the security price for portfolio security from one of separate data feeds that provides a security price for the portfolio security.

4. The method of claim 2 wherein each of the separate price data feeds provides security prices of the portfolio securities at respective random offsets within the pricing interval.

5. The method of claim 2 wherein security prices are selected from each of the separate price data feeds at respective predetermined timing offsets within the pricing interval.

6. The method of claim 1 wherein the plurality of partial price components is generated by adjusting each of the selected security prices by a corresponding quantity weight.

7. The method of claim 1 wherein the plurality of partial price components is generated by filtering the selected security prices and then adjusting each of the filtered selected security prices by a corresponding quantity weight.

8. The method of claim 1 wherein the timing offsets vary from a first pricing interval, during which the method of claim 1 is performed, to a second pricing interval during which the method of claim 1 is performed.

9. The method of claim 1 wherein a first pricing entity selects the security prices and conveys the selected security prices to a second pricing entity using only pseudonym security identifiers, and the second pricing entity determines the plurality of partial price components.

10. A method of pricing a collective investment vehicle (CIV) having a plurality of portfolio securities, comprising:
    a pricing-consolidator computer system receiving a plurality of partial CIV prices, wherein each of the plurality of partial CIV prices is provided by a different one of a plurality of a pricing-agents that determined the respective partial CIV price by:
    (i) obtaining prices of portfolio securities, the prices having an associated time offset within a pricing interval, wherein the time offset for each of the determined partial CIV prices is not identical;
    (ii) adjusting the prices by a corresponding quantity weight; and,
    (iii) aggregating the adjusted prices into a partial CIV price;
    the pricing-consolidator computer system summing the plurality of partial CIV prices into an intraday indicative value (IIV) of a CIV price; and,
    the pricing-consolidator computer system transmitting the IIV for publication into an intraday indicative value (IIV) of a CIV price; and,
    the pricing-consolidator computer system transmitting the IIV for publication.

11. The method of claim 10 wherein the each partial CIV price was further determined by the respective pricing-agent filtering the prices using a moving average prior to adjusting the prices by a corresponding quantity weight.

12. The method of claim 10 wherein each of the plurality of partial CIV prices is based on a corresponding partial portfolio composition file.

13. The method of claim 12 wherein only a portion of the composition of the plurality of portfolio securities is identified by each corresponding partial portfolio composition file.

14. The method of claim 12 wherein a portion of the quantities of at least some of the portfolio securities are divided among more than one corresponding partial portfolio composition files.

15. The method of claim 10 wherein step (i) is performed by a first pricing entity and step (ii) is performed by a second pricing entity, and the prices are conveyed between the first and second pricing entities using pseudonym security identifiers.

16. A method of pricing a collective investment vehicle (CIV) having a plurality of portfolio securities, comprising:

at a pricing-agent computer system, receiving partial portfolio composition data for a subset of the portfolio securities, at the pricing-agent computer system, generating a plurality of pricing data record sets, each pricing data record set comprising independently determined pricing data for a set of the portfolio securities from the subset, and wherein the at least two of the pricing data record sets contain pricing data for one or more of the same portfolio securities;

at the pricing-agent computer system, determining a security price for each portfolio security by selecting pricing data for the portfolio security from only one of the pricing data record sets;

at the pricing-agent computer system, for each portfolio security from the subset using (i) the security price for the portfolio security and (ii) an associated portfolio security quantity weight for the portfolio security as a basis for generating a plurality of partial price components based on the selected security prices;

at the pricing-agent computer system, using the partial price components as a basis for determining a partial price value for the subset of the portfolio securities; and transmitting the determined partial price value from the pricing-agent computer system for aggregation with other partial price values associated with the CIV to determine and publish an intraday indicative value (IIV) of a CIV share.

17. The method of claim 16 wherein, for the one or more portfolio securities having pricing data contained in at least two of the pricing data record sets, determining the security price for the portfolio security comprises randomly selecting the pricing data for the portfolio security from only one of the at least two pricing data record sets containing pricing data for the portfolio security.

18. The method of claim 16 wherein the independently determined pricing data of the plurality of pricing data record sets is obtained by generating each pricing data record set at a different time offset within a pricing window.

19. The method of claim 18 wherein the time offsets are predetermined.

20. The method of claim 18 wherein the time offsets are randomly determined.

21. A computer readable storage medium having stored therein instructions to cause a microprocessor to execute the following steps:

electronically receiving a plurality of partial price values for a collective investment vehicle (CIV), wherein the CIV comprises a plurality of portfolio securities, wherein each partial price value for the CIV is electronically received from a different one of plurality of pricing agents that determines the partial price value by:
(i) obtaining a security price for each of a subset of portfolio securities;
(ii) adjusting each security price by a corresponding quantity weight; and,
(iii) aggregating the adjusted security prices for the subset of portfolio securities into the partial price value;

using the received partial price values for automatically computing an intraday indicative value (IIV) for a CIV share; and, electronically transmitting the IIV via a data communication feed.

22. The computer readable storage medium of claim 21 further including instructions to cause a microprocessor to execute the following step:

transmitting a plurality of partial position data records containing partial position information to the plurality of pricing agents.

* * * * *

UNITED STATES PATENT AND TRADEMARK OFFICE
CERTIFICATE OF CORRECTION

| | | |
|---|---|---|
| PATENT NO. | : 7,925,562 B2 | Page 1 of 1 |
| APPLICATION NO. | : 11/838681 | |
| DATED | : April 12, 2011 | |
| INVENTOR(S) | : Paul Edward Kuhnle et al. | |

It is certified that error appears in the above-identified patent and that said Letters Patent is hereby corrected as shown below:

Title Page item no. (73) Assignee:

Assignee, delete "Diz Ventures" and replace with --D12 Ventures--

Signed and Sealed this
Twenty-fifth Day of August, 2015

Michelle K. Lee
*Director of the United States Patent and Trademark Office*